United States Patent [19]

Miller

[11] Patent Number: 4,605,116

[45] Date of Patent: Aug. 12, 1986

[54] CONVEYOR SYSTEM USED WITH APPARATUS FOR UNLOADING COMMINUTED MATERIALS

[75] Inventor: Charles P. Miller, McHenry, Ill.

[73] Assignee: Miller Formless Co., Inc., McHenry, Ill.

[21] Appl. No.: 581,284

[22] Filed: Feb. 17, 1984

Related U.S. Application Data

[63] Continuation-in-part of Ser. No. 414,383, Sep. 2, 1982, abandoned.

[51] Int. Cl.⁴ .............................................. B65G 47/44
[52] U.S. Cl. ..................................... 198/364; 198/535; 198/860.5
[58] Field of Search ............... 198/585, 671, 811, 861, 198/866, 594, 525, 535, 860, 511, 518, 519, 364, 860.5; 414/137–139, 140–146, 217, 220, 224, 291, 292; 277/DIG. 7

[56] References Cited

U.S. PATENT DOCUMENTS

| | | | |
|---|---|---|---|
| 3,734,271 | 5/1973 | Dolgolenko et al. | 198/811 |
| 4,234,075 | 11/1980 | Tingskog | 198/594 |
| 4,365,764 | 12/1982 | Marx | 277/DIG. 7 X |
| 4,376,543 | 3/1983 | Sakagami | 277/DIG. 7 X |

FOREIGN PATENT DOCUMENTS

| | | | |
|---|---|---|---|
| 0556023 | 7/1932 | Fed. Rep. of Germany | 198/861 |
| 1229256 | 11/1966 | Fed. Rep. of Germany | 414/291 |
| 0781158 | 11/1980 | U.S.S.R. | 198/585 |

Primary Examiner—Joseph E. Valenza
Assistant Examiner—Lyle Kim
Attorney, Agent, or Firm—Neuman, Williams, Anderson & Olson

[57] ABSTRACT

The invention consists of conveyor system that receives comminuted material from an unloading apparatus, discharges the material on a conveyor and transports it to a storage, handling or other transport system. The system provided includes a discharging apparatus and a conveyor apparatus. The conveyor apparatus comprises an elongate conveyor housing having an elongate opening, a conveyor belt disposed in the housing, and a flexible belt cover overlying the opening of the housing in covering engagement. The discharging apparatus comprises a top receiving section connected to an unloading apparatus, a lower shroud overlying the opening of the conveyor housing and two discharging chutes connecting the top section and the shroud and defining an aperture between them. The shroud disengages the cover from the housing and guides it through the aperture and through the discharging apparatus while maintaining covering engagement of the remaining portions of the cover and while depositing material on the conveyor belt.

13 Claims, 12 Drawing Figures

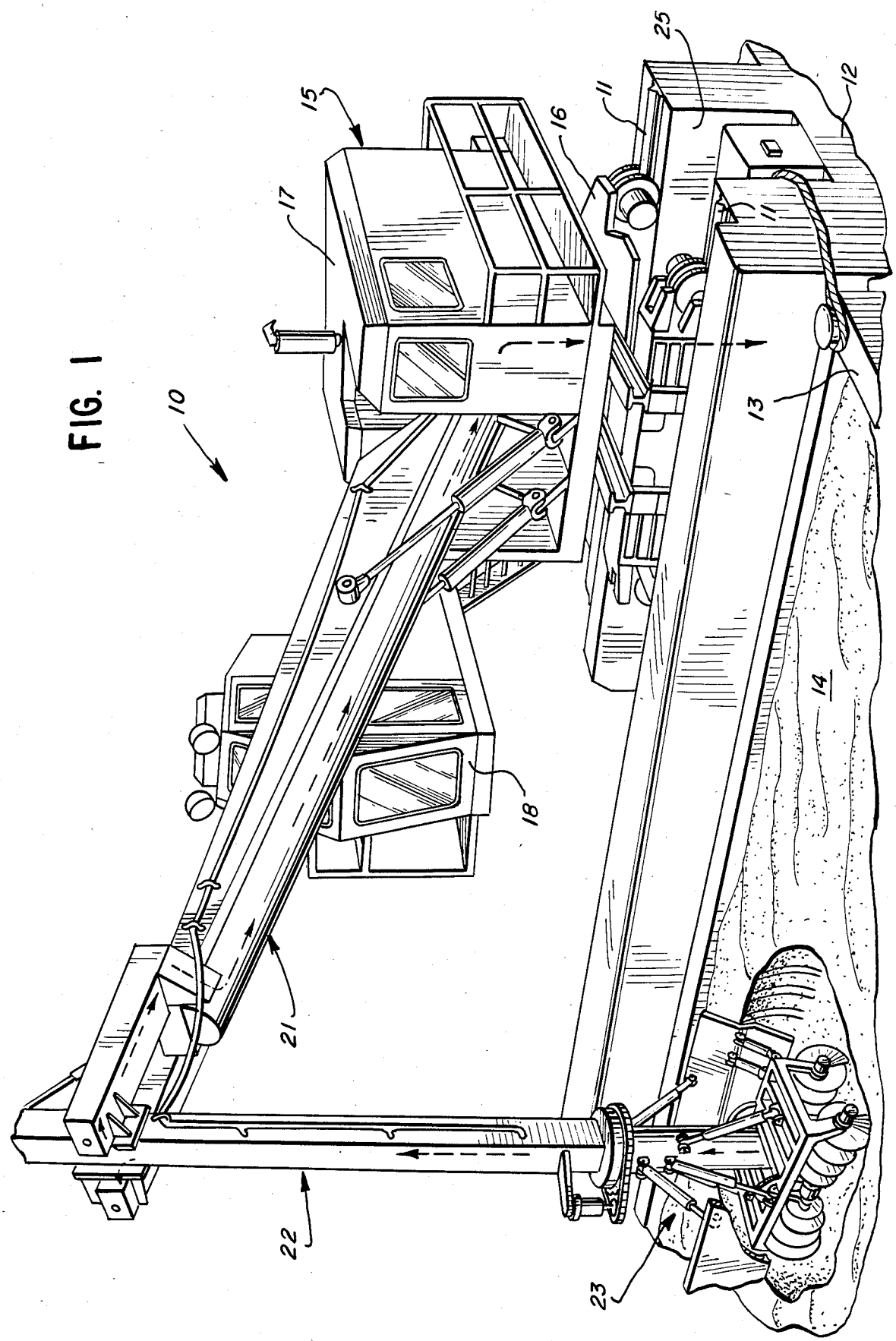

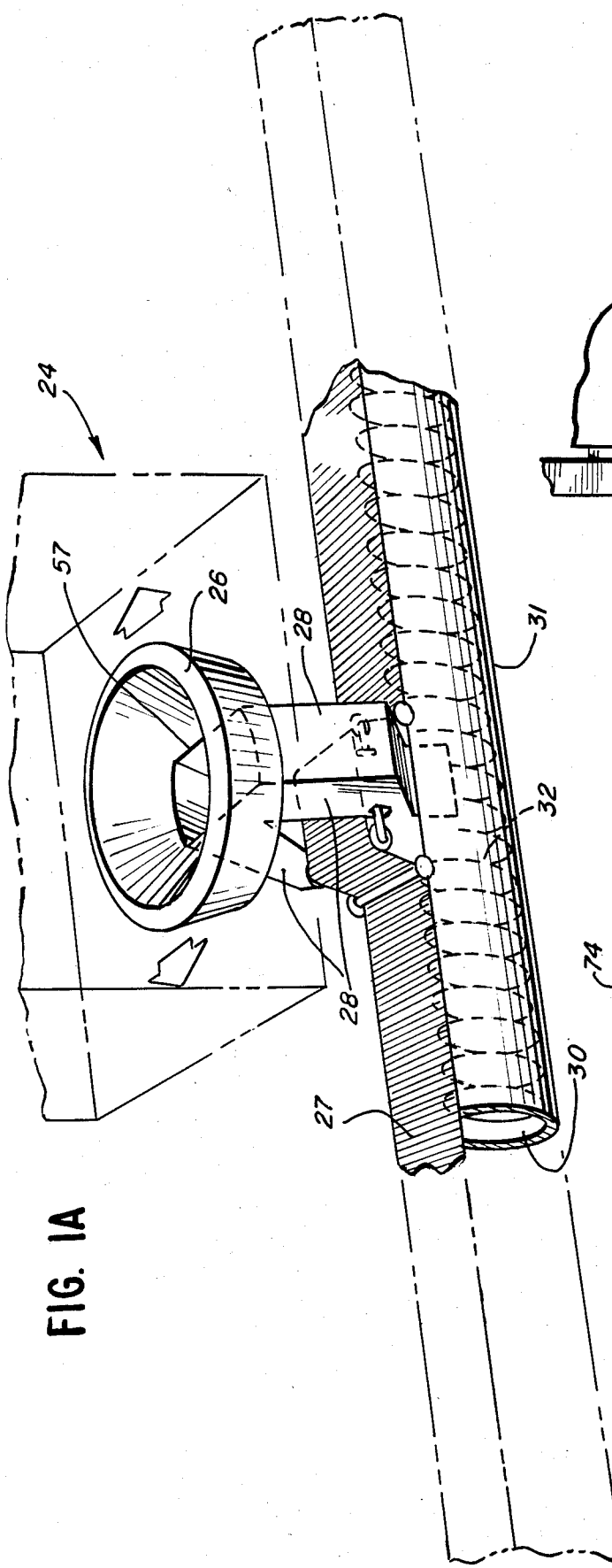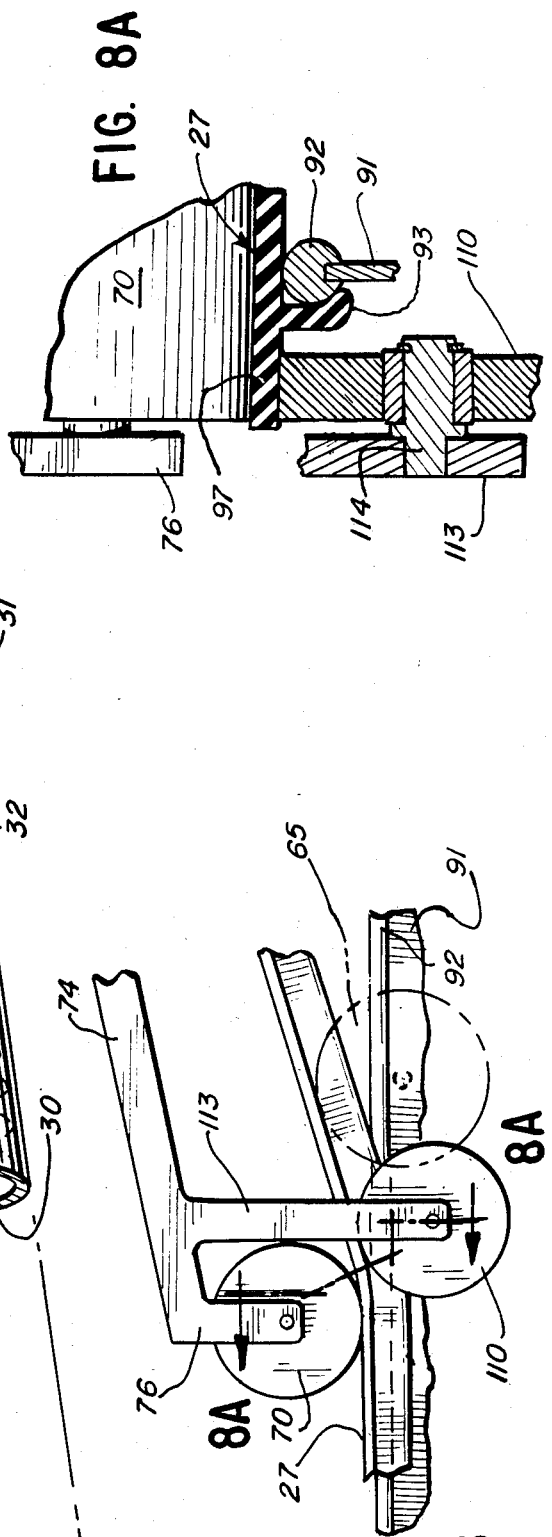

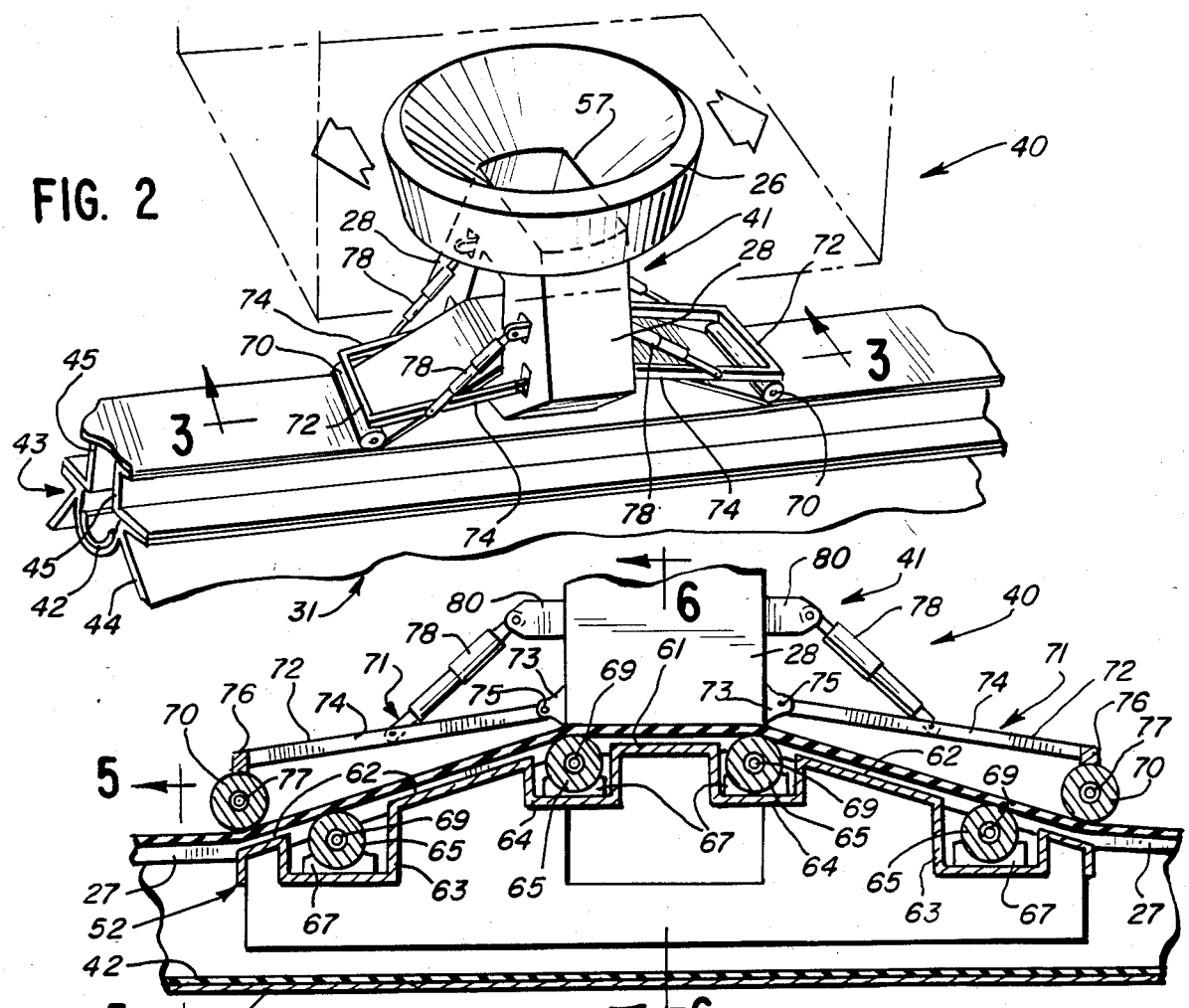
FIG. 2
FIG. 3
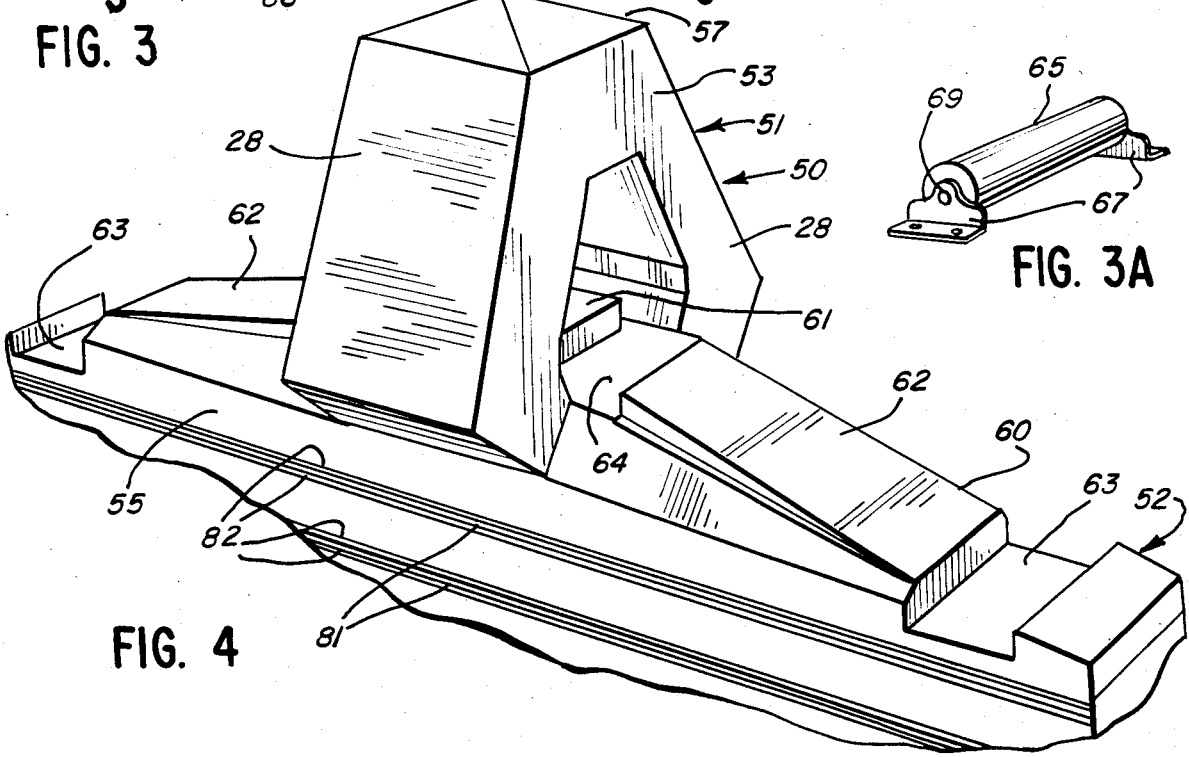
FIG. 3A
FIG. 4

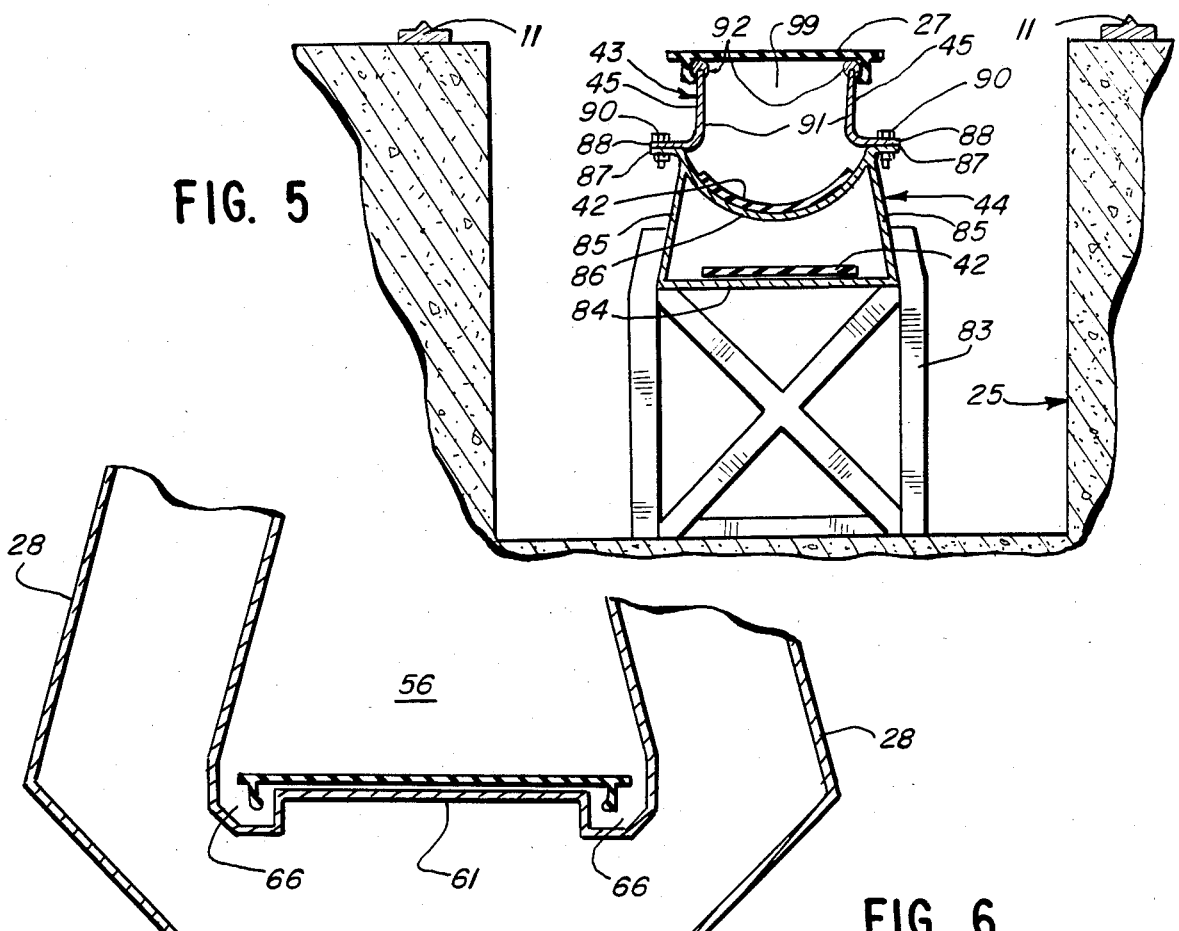
FIG. 5
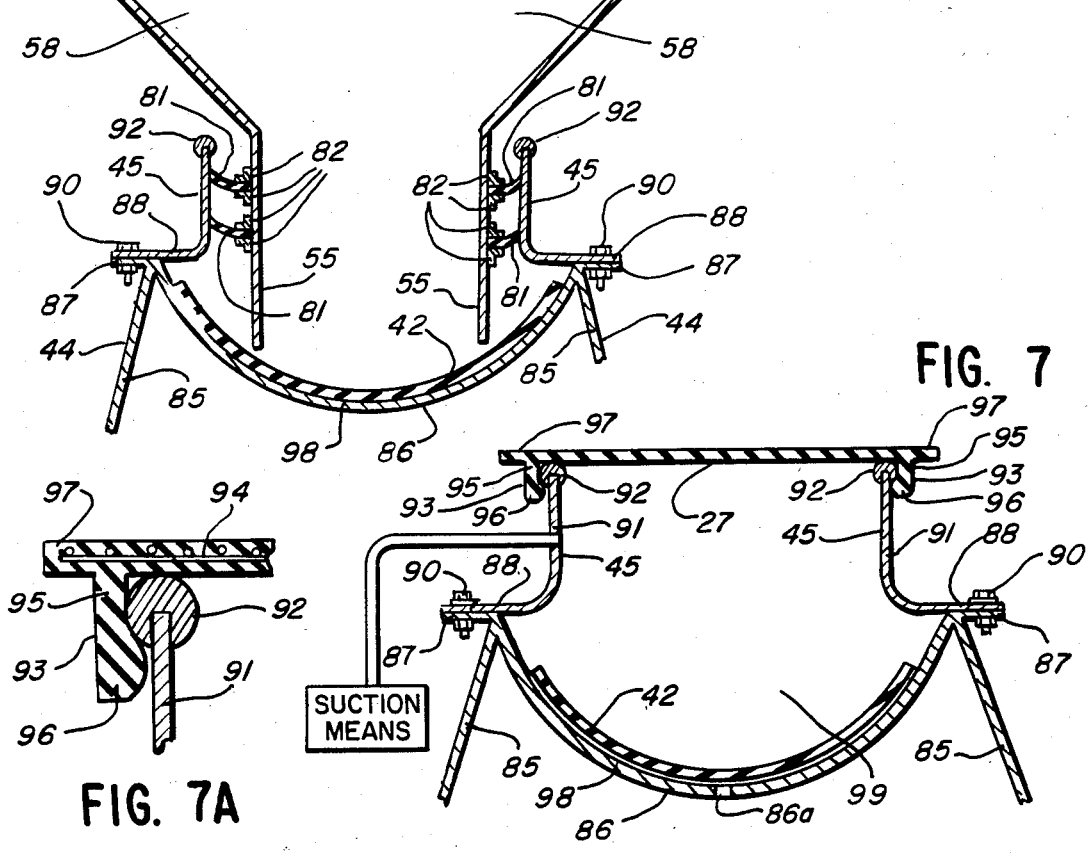
FIG. 6
FIG. 7
FIG. 7A

CONVEYOR SYSTEM USED WITH APPARATUS FOR UNLOADING COMMINUTED MATERIALS

This application is a continuation-in-part of application Ser. No. 414,383, filed Sept. 2, 1982, abandoned Jan. 16, 1985 for an "Apparatus and Method for Unloading Bulk Materials."

BACKGROUND OF THE INVENTION

1. Field of the Invention

The present invention relates to a conveyor system used in conjunction with an unloading apparatus to transfer pulverized or comminuted materials from relatively large cargo containers or vessels to a material transport, handling or storage system. More particularly, this invention relates to a conveyor system used in conjunction with an unloading apparatus to transfer dry cement or other loose, powdered material from the unloading apparatus to a material transport, handling or storage system.

The transfer of various comminuted materials presents difficult problems; however, cement, because of its physical properties, is particularly troublesome. Dry cement is a fine powdered material, 100 mesh or under in size. It is mildly abrasive, and it flows relatively freely at an angle of repose of 30° to 45°. When aerated it becomes fluid-like, but when packed or settled, it becomes dense and difficult to handle. It is well known that cement has strong adhesive properties when combined with water, and it deteriorates drastically when exposed to moisture. Once properly mixed, it sets and hardens very quickly.

When the cement is in its fluffy, aerated condition, it poses unique handling and transport problems. If the container used to hold the cement or the system used to transport it are open to the elements, the wind blows away the dust-like particles of cement. In addition to the loss of the product, cement particles in the air present a number of problems. They create a harsh environment which accelerates the wear of equipment and creates a health hazard to people who must work in this environment.

If the containers or transport system are open to moisture, the cement will combine with the water, set and quickly harden into a solid mass. Because of the cement's strong adhesive properties, this mass may adhere to the equipment, resulting in wear or failure of the equipment and in undesirable and expensive downtime. Cement which has combined with water and set is waste material requiring disposal. The cost of lost material and disposal is also an undesirable expense. A material handling system, including a conveyor, must be capable of handling the cement while preventing the cement from damaging the equipment, and it must be capable of maintaining the cement in a stable condition.

2. Description of the Prior Art

Pneumatic systems have been used to move small quantities of cement. However, these pneumatic systems use positive pressures to move the cement. In using positive pressures, the systems require excessive power and expensive equipment for air-cement separation. Accordingly, these systems have proven inefficient or ineffective for larger quantities. Thus, organizations which move large quantities of cement, such as the manufacturers of the cement, have relied upon several different types of mechanical systems.

One known type of mechanical system uses scrapers, feeders and enclosed vertical conveyors to remove cement from barges and other material containers and place it on a transport system which takes it to another material handling or storage system. The transport system most commonly used is a horizontal conveyor. Unhoused horizontal conveyor systems have been used, but these devices expose the cement to wind, rain, and snow and encounter the problems discussed above. Totally enclosed horizontal conveyor systems have also been used; but with these systems the apparatus can only deposit the cement at a limited number of points along the conveyor. Most of these systems also require that the barge or container move during the unloading because of the limited number of entry points. In addition, since the conveyor mechanism is totally enclosed, when the system breaks down the resulting downtime is long due to the difficulty of gaining access to the conveyor mechanism.

OBJECTS OF THE INVENTION

The conveyor system of the present invention avoids the cement handling problems of the prior devices discussed above. The system is a simple, compact system that allows the unloading apparatus to continuously deposit cement on the conveyor apparatus at any point along its length. The system's housing shields the conveyor and the material on it from the wind, preventing costly material loss and damage to the equipment itself. It also shields the material against deleterious moisture in the form of rain and snow and against moisture from any waterway along the unloading area. It provides easy access to its internal mechanism, allowing quick repairs and maintenance and reducing expensive downtime. The housing also provides a safety barrier preventing injury to those working around it.

It is an object of the present invention to provide an improved, low cost, simple, and compact conveyor system for use with an unloading apparatus for powdered materials.

It is another object of this invention to provide an improved conveyor system that allows an unloading apparatus to continuously deposit cement or any other powdered material on a conveyor located within a covered housing at any point along the housing.

It is yet another object of the present invention to provide a conveyor system with a housing that shields the material carried by the systems conveyor belt from the wind and from moisture and that provides a safety barrier preventing injury to those working around it.

It is still another object of this invention to provide a conveyor system that allows easy access to its internal mechanism for quick repairs and maintenance, thus, reducing expensive downtime.

Other objects, advantages, and features of the present invention will become apparent upon reading the following detailed description and appended claims and upon reference to the accompanying drawings.

SUMMARY OF THE INVENTION

The invention provides an improved conveyor system that receives comminuted materials from an unloading apparatus and transports it to a storage, material handling or other transport system. The system provided includes a conveyor apparatus having an elongate conveyor housing with an elongate opening in it, conveying means disposed within the conveyor housing, and a flexible belt cover overlying the entire opening of the housing, the flexible belt cover also having flanges that interlockingly engage the housing along the opening. The system also includes a discharging apparatus with a top receiving section adapted for connection to the unloading apparatus, discharge chutes, and a lower shroud. The discharging apparatus moves continuously and longitudinally over the opening in the conveyor apparatus housing and places material on the conveying means of the conveyor apparatus. The shroud of the discharging apparatus is located partially within the conveyor housing. As the discharging apparatus moves over the opening of the conveyor housing, the shroud disengages the flexible cover from the housing and the flexible cover passes over the top of the shroud. After the cover has passed over the shroud the shroud causes the cover to reengage the housing and lock on to the conveyor apparatus over the conveyor housing opening.

BRIEF DESCRIPTION OF THE DRAWINGS

For a more complete understanding of this invention, one should now refer to the embodiments illustrated in greater detail in the accompanying drawings and described below by way of an example of the invention. In the drawings:

FIG. 1 is a perspective view of the unloading apparatus used with the present invention. Copending application Ser. No. 414,383 of which this application is a continuation-in-part discloses this unloading apparatus, and FIG. 1 of that application illustrates it;

FIG. 1A is a perspective view of the conveyor and discharging apparatus assembly used with the unloading apparatus of FIG. 1.

FIG. 2 is a perspective view of the preferred embodiment of this invention;

FIG. 3 is a sectional view taken along line 3—3 of FIG. 2;

FIG. 3A is a perspective view of a roller assembly used in the horizontal shroud of the discharging apparatus shown in FIG. 3.

FIG. 4 is a partial perspective view illustrating the housing of the discharging apparatus of the present invention;

FIG. 5 is a sectional view taken along line 5—5 of FIG. 3 and showing the conveyor belt and housing on a base support located in a shallow rectangular pit between two rails used to support the unloading apparatus;

FIG. 6 is a sectional view taken along line 6—6 of FIG. 3;

FIG. 7 is a partial enlarged view of the conveyor belt and housing of FIG. 5;

FIG. 7A is a partial enlarged view of one of the conveyor housing sidewall and cover connections of FIG. 7;

FIG. 8 is a fragmentary view showing a portion of an alternative embodiment of the present invention;

FIG. 8A is a sectional view taken along line 8A—8A of FIG. 8.

While the applicant will describe the invention in connection with a preferred embodiment with several alternative features, one will understand that the invention is not limited to this embodiment and these alternative features. Furthermore, one should understand that the drawings are not to scale and that the embodiments are illustrated by graphic symbols, diagrammatic representations and fragmentary views. In certain instances, the applicant may have omitted details which are not necessary for an understanding of the present invention such as conventional details of fabrication and assembly.

DETAILED DESCRIPTION OF THE DRAWINGS

Turning now to the drawings, FIG. 1 illustrates a material unloading apparatus 10 mounted on two rails 11 of a dock structure 12 unloading a barge 13 containing comminuted material 14. The unloading apparatus 10 generally comprises a support means 15 including a carriage means 16 and control apparatus 17 and 18, a first conveyor means 21, a second conveyor means 22, and a feeder means 23. FIG. 1A illustrates a discharging assembly 24 disposed centrally in the carriage means 16 connected to and disposed underneath the control means 17 to receive the unloaded comminuted material. (See FIG. 1.) The carriage means 16 carries the discharge assembly 24 back and forth in channel 25 (See FIG. 1) of the dock structure 12 as the carriage means 16 moves back and forth on top of channel 25 on the rails 11 located on opposite sides of the channel. The discharge assembly 24 generally comprises a funnel 26 that collects the material discharged from the first conveyor 21 and passes the material around conveyor housing cover 27 through side chutes 28 into the conveyor chamber 30. In the embodiment of FIG. 1A, the conveyor assembly 31 contains an auger-type conveyor 32 in chamber 30 as described in application Ser. No. 414,383. Copending application Ser. No. 414,383 discloses the unloading apparatus 10 in greater detail and generally discloses the discharge assembly 24 and the conveyor assembly 31.

FIG. 2 illustrates the complete discharging and conveyor assembly 40 in greater detail. The discharging and conveyor assembly 40 generally comprises the discharging assembly 24 and the chutes 28 which are principal functional components of discharging guide mechanism 41 and the elongate conveyor assembly 31. In the embodiment of FIG. 2, the conveyor assembly 31 includes a conveyor belt 42 and a conveyor frame 43 having a base 44, two vertical sidewalls 45 and a housing cover 27.

Referring now to FIGS. 3, 4, and 6 the material discharging guide mechanism 41 includes a chute assembly 50 made of sheet metal or any other suitable material. The chute assembly 50 consists of a vertical chute 51 and an elongate horizontal shroud 52. The vertical chute 51 is a claw-like enclosure with a rectangular top chute 53 connected to and disposed beneath the funnel 26 of the unloading apparatus 10 and two sloping, hook shaped discharge side chutes 28 of rectangular cross-section extending from opposite sides of top chute 53. The side chutes 28 communicate with the shroud 52 through the opposite sidewalls 55. They, thus, define a transverse passageway 56 between them. The cement or other powdered material from funnel 26 (See FIGS. 1A and 2) enters the vertical chute 51 through an opening 57 located at the top of top chute 53. The cement falls into the top chute 53 and then moves into the discharge side chutes 28. After falling through the discharge chutes 28, it enters into the horizontal shroud 52 through two openings 58 in the two opposite sidewalls 55 of the shroud 52.

The top 60 of the shroud 52 has a horizontal section 61 disposed between the two discharge chutes 28 and two sloping sections 62 extending from opposite ends of the horizontal section 61. The sloping sections 62 have transverse channels 63 and the horizontal section 61 has transverse channels 64 to receive rollers 65. The channels 63 and 64 have flat bottoms that serve as footings for the rollers 65 (shown in FIG. 3A). The horizontal section 61 of top 60 has a longitudinal recess 66 along each edge next to the discharge chutes 28 to receive the conveyor cover 27. (See FIG. 6).

FIG. 3A illustrates a roller 65 on a pair of journaled mounting brackets 67. A shaft 69 extends between the brackets 67 through the center of roller 65. Four pairs of brackets 67 secured to the shroud 52 in channels 63 and 64 with conventional nut and bolt, screw, or weld connections, support the four rollers 65. The conveyor cover 27 which normally rests in sealing engagement with the conveyor side walls 45 rides up on these rollers 65 as the material discharging guide 41 moves along the conveyor housing 43 during the operation of the assembly 40.

The material discharging mechanism 41 includes a roller 70 at each end of the shroud 52 (See FIGS. 2 and 3). The rollers 70 are similar in shape and size to the rollers 65 and function as pressure means to hold the cover 27 down against conveyor sides 45. Each roller support 71 includes a U-shaped member 72 and a pair of brackets 73 sealed to the walls of discharge chutes 28. Legs 74 of member 72 are pivotally connected to brackets 73 by pins 75. The U-shaped bar 72 has apertured extensions 76 that receive a shaft 77 which supports roller 70 for rotation. Each roller support 71 includes a pair of hydraulic rams 78 having one end pivotally mounted to the leg 74 and the other end pivotally mounted to the discharge chute 28 using a bracket 80 located above the bracket 73. The rams 78 have fluid connections to the control sections 17 and 18 whereby the one operating the material discharging mechanism can vary the downward force exerted by the rollers 70 on cover 27. The rollers 70 ride on top of the conveyor cover 27 and depending on the direction in which the material discharging mechanism is moving, one holds the cover 27 against sidewalls 45 and roller 65 as the apparatus 10 moves forward and the other presses the cover down to lock it in place on top of the conveyor sidewalls 45 as the apparatus 10 passes.

A pair of flaps 81 is attached to the outside of each sidewall 55 of the discharging guide mechanism 41 (See FIGS. 4 and 6). The flaps 81 are flat, elongate strips of rubber or any other suitable flexible material, and they extend along the entire length of the sidewalls 55. A pair of elongate angle irons 82 clamp each flap 81 and attach it to the sidewall 55. These flaps 81 brush up against conveyor frame sidewalls 45 (as shown in FIG. 6). Thus, the flaps 81 provide a dust-tight seal preventing dust particles from escaping between the sidewalls 45 and the sidewalls 55.

Referring now to FIGS. 5, 7, and 7A, the conveyor assembly 31 is shown in position on a conveyor support structure 83 located in the channel 25 between the two rails 11 on which the unloading apparatus 10 rides. The channel 25, the conveyor support structure 83 and the conveyor assembly 31 preferably have the same length as the barge or other container vessel to permit the operator of the unloading apparatus maximum range of movement. The conveyor assembly 31 is an elongate structure with a base 44 with a flat bottom 84, sloping sidewalls 85, and a concave top 86. The concave top 86 serves as a support for the belt 42, often referred to as an endless "jetbelt" which returns in the space above bottom 84. The base 44 also includes horizontal side flanges 87 on which horizontal side flanges 88 of the conveyor frame sidewalls 45 rest. These side flanges 87 and 88 provide an air-tight connection between the base 44 and the sidewalls 45 with nuts and bolts 90 or any other suitable connecting devices or methods.

The sidewalls 45 have a vertical portion 91, extending from the flanges 88 and a rounded top 92 attached to the vertical portion 91 by a method such as welding. The diameter of the round top 92 is substantially greater than the thickness of the vertical portion 91.

The cover 27 is a flat horizontal belt with a pair of flanges 93 located a spaced distance from the edges of the belt and extending downward. The cover 27 is made of a flexible material such as rubber or tough flexible thermoplastic. A wire mesh 94 embedded into the planar portion of the belt (as shown in FIG. 7A) gives the belt structural support against sagging and tensile strength. Each flange 93 has a stem 95 and a head 96 of greater thickness than the stem and directed inwardly. The location and configuration of the interlocking flanges 93 is such that they engage and wrap around the round top 92 and lock the cover 27 in place. Planar lips 97 extend beyond the cover web 27 for purposes to be explained below. The interlocking flange arrangement used in the preferred embodiment is not the only arrangement that can provide a secure connection between the cover 27 and the sidewalls 45. For example, an arrangement with two interlocking ears, one on the outside and one on the inside of each sidewall 45, will also provide an adequate connection.

The conveyor belt 42 is an endless jetbelt that is well known in the material handling industry. It is a flexible belt which forms into a concave configuration to follow concave top 86. It rides on an air cushion 98 between the bottom of the belt 42 and the top surface of the top section 86 of the base 44. Compressed air introduced through openings 86a in the top section 86 of the base 44 beneath belt 42 produces the air cushion 98. The compressed air does not disturb the powdered material carried by the conveyor belt 42 because a suction means (see FIG. 7) places the trough 99 under subatmospheric pressure. This suction means also aids in keeping the cover 27 in place.

FIGS. 8 and 8A illustrate an alternate embodiment of the invention. The rollers 65 carried by shroud 52 engage the cover 27 between the flanges 93 and effect removal of the cover 27 from the sidewalls 45. As shown in FIG. 8, a distal roller 110 may be added to each end of each roller support 71 between roller 70 and roller 65. A second extension 113 of the roller supports 71 supports roller 110. A shaft 114 rotatedly connects the roller 110 and the support 113 together.

The roller 110 engages the underside of cover 27 along lip 97. It aids the roller 65 in disengaging the interlocking flanges 93 from the cylindrical cap 92 of the conveyor frame sidewall 45 by lifting the end portions 97 up before the roller 65 engages and shifts the middle underside of the cover 27. Without rollers 110, the roller 65 engages the underside of cover 27 between the cover's two interlocking flanges 93 and lifts the cover 27 upward. Before the interlocking flanges 93 disengage the sidewalls 45, the lip 97 of the cover 27 is bowed slightly downward and the interlocking beads 96 wrap around the cap 92 of sidewalls 45 even further. The roller 110 prevents this bowing and facilitates disengagement.

In operation, the unloading apparatus moves, parallel to the barge 13 over the channel 25 on the rails 11. In doing so, it moves the material discharging mechanism 41 longitudinally over the conveyor apparatus 31. When the operator moves the material discharging mechanism 41 to the right, roller 70 at the leading portion of the assembly 40 rolls over the conveyor cover 27 holding the cover in locking engagement with conveyor sidewalls 45. The hydraulic rams 78 supply the force for applying and varying the pressure provided by roller 70. The roller 65 adjacent roller 70 rolls beneath cover 27 and forces it upward so that the interlocking flanges 93 of the cover 27 disengage the caps 92 on sidewalls 45. The rollers 65 guide the belt over the material discharging mechanism's shroud 52. The trailing top roller 70 rolls over the cover 27 and, with the force supplied by the hydraulic rams 78, presses the cover 27 back into locking engagement with the sidewalls 45. The operation is completely bidirectional. The depositing mechanism 41 can thus deposit cement or other powdered material on the conveyor belt 42 at any location along the conveyor apparatus 31 while keeping the apparatus substantially sealed.

The apparatus shields the material from wind and moisture, prevents material waste, provides a safety barrier preventing injury to workers, and allows easy access to its components for quick repair and maintenance, reducing expensive downtime. Particular embodiments of the invention have been shown and described, but one will understand, that the invention is not limited to these embodiments since those skilled in the art to which the invention pertains may make modifications and other embodiments using the principles of this invention, particularly upon considering the foregoing teachings. The applicant, therefore, by the appended claims intends to cover any such modifications and other embodiments as incorporate those features which constitute the essential feature of this invention.

What is claimed is:

1. Enclosed conveyor apparatus for receiving comminuted material therealong and confining such materials therein while conveying the material, said apparatus comprising: an elongate housing having sidewall portions defining an elongated opening for receiving such materials therethrough; conveyor means disposed within said housing and moving said material longitudinally through said housing; discharge guide means disposed over said opening and movable therealong for discharging such material into said housing at any position along said opening; flexible cover means normally closing said opening and being selectively displaceable by said discharge guide means as said guide means moves along said opening permitting discharge of such material into said housing through said guide means and opening at any such position while maintaining a substantially dust-tight cover over said opening; said discharge guide means having shroud means overlying said opening and separating said cover means from said housing while maintaining an effective seal of said housing, said shroud means including sidewalls extending in overlapping spaced relation with the sidewalls of said elongate housing, and yieldable sealing means providing sliding seals between said overlapping sidewalls and said sidewall portions of said housing for providing a dust-tight seal between said discharge guide means and said housing as said discharge guide means is moved therealong.

2. Conveyor apparatus as in claim 1 and including pressure means urging said flexible cover means in place on said housing over said opening as said discharge guide means progressively displaces and replaces said cover means over said opening and as said discharge moves along said opening.

3. A conveyor apparatus as in claim 1 wherein said cover means comprises a continuous flexible belt having elongate edge portions normally engaging said housing along opposite edges of said opening.

4. A material handling system for unloading comminuted material from a supply and transporting it to a receiving area, said system comprising: an elongate conveyor including a housing having sidewall portions defining an elongate opening receiving such material therethrough into said housing; an unloader including a discharge guide means disposed over said opening for discharging such material into said housing and movable therealong; flexible cover means closing said opening and progressively displaceable by said discharge guide means as said guide means moves along said opening permitting discharge of such material into said housing through said guide means and opening while maintaining a substantially dust-tight cover over said opening; and means for partially evacuating said housing to maintain said comminuted material on said conveyor and to maintain said flexible cover means in place over said opening; said discharge guide means having shroud means overlying said opening and separating said cover means from said housing while maintaining an effective seal of said housing, said shroud means including sidewalls extending in overlapping spaced relation with the sidewalls of said elongate housing, and yieldable sealing means providing sliding seals between said overlapping sidewalls and said sidewall portions of said housing for providing a dust-tight seal between said discharge guide means and said housing as said discharge guide means is moved therealong.

5. Conveyor apparatus for receiving comminuted material at any location therealong and confining such material therein while conveying the material, said apparatus comprising: an elongate conveyor including a housing having sidewall portions defining an elongate opening for receiving such material therethrough and elongate conveying means disposed centrally within said housing; discharge guide means disposed over said opening and movable therealong for discharging such material into said housing including chute means and shroud means with a portion of said shroud means disposed within said housing and with the sidewalls of said shroud means in spaced, overlapping relation with the sidewalls of said housing whereby the matedrial drops on to said conveying means; flexible cover means closing said opening and displaceable by said shroud means as said guide means moves along said opening permitting discharge of such material into said housing through said guide means and opening of said housing while maintaining a substantially dust-tight cover over said opening; said discharge guide means including yieldable sealing means providing sliding seals between said overlapping sidewalls and said sidewall portions of said housing for providing a dust tight seal between said discharge guide means and said housing as said discharge guide means is moved therealong, said discharge guide means also including means for guiding said cover means over the top of the shroud means whereby said cover substantially forms a shallow arc over said shroud means.

6. The conveyor apparatus of claim 5 wherein said conveying means is a concave belt that slides over an air cushion.

7. The conveyor apparatus of claim 5 wherein said flexible cover means is a flexible horizontal belt with spaced flanges that interlockingly engage said conveyor housing and provide a substantially dust-tight cover over said opening.

8. The conveyor apparatus of claim 5 wherein said chute means defines a transverse passageway therethrough allowing said flexible cover means to pass through said guide means and said shroud means includes separation means that disengage and pressure means that reengage said cover means with said housing.

9. The conveyor apparatus of claim 8 wherein said pressure means is variable and includes a roller that re-engages said cover means with said housing.

10. The conveyor apparatus of claim 8 wherein said separation means includes a roller that disengages the cover means from said housing.

11. Enclosed conveyor apparatus for receiving comminuted material therealong and confining such material therein while conveying the material, said apparatus comprising: an elongate housing having side wall portions defining an elongated opening for receiving such materials therethrough; conveyor means disposed within said housing and moving said material longitudinally through said housing; flexible cover means normally closing said opening, being selectively displaceable, and maintaining a substantially dust-tight cover over said opening; and discharge guide means disposed over said opening and movable therealong, said discharge guide means having an elongate shroud means overlying said opening and selectively displacing a portion of said cover means from said housing while maintaining an effective seal of said housing, said shroud means including sidewalls, a top with a center segment and sloping side segments inclined at a shallow angle downward of the center segment, yieldable sealing means providing sliding seals between said sidewalls and the housing sidewalls, and means for guiding said flexible cover means over the top of said shroud means, whereby said cover-means substantially forms a shallow arc over said shroud means as said shroud means displaces said cover means, said discharge guide means also having a receiving means for receiving the comminuted material over said cover means, and chute means for discharging such material from said receiving means, around said displaced portion of said cover means, between said displaced portion of said cover means and said side wall portions of said housing, through said opening and into said housing at any position along said opening.

12. A conveyor apparatus as in claim 11, wherein said cover means comprises a flexible belt having elongate edge portions normally engaging said housing along opposite edges of said opening and said discharge guide means discharges said comminuted material around one elongate edge portion of said cover means and into said housing.

13. A conveyor apparatus as in claim 11, wherein said cover means comprises a flexible belt having elongate edge portions normally engaging said housing along opposite edges of said opening and said discharge guide means discharges said comminuted material around both elongate edge portions of said cover means and into said housing.

* * * * *